United States Patent [19]

Stenzinger

[11] 4,125,181
[45] Nov. 14, 1978

[54] CLUTCH DISENGAGING DEVICE HAVING A SELF-CENTERING CLUTCH PRESSURE BEARING

[75] Inventor: Karlheinz Stenzinger, Hesselbach, Fed. Rep. of Germany

[73] Assignee: SKF Kugellagerfabriken GmbH, Schweinfurt, Fed. Rep. of Germany

[21] Appl. No.: 779,695

[22] Filed: Mar. 21, 1977

[30] Foreign Application Priority Data

Mar. 23, 1976 [DE] Fed. Rep. of Germany ... 7608859[U]

[51] Int. Cl.$^2$ ............................................. F16D 19/00
[52] U.S. Cl. .................................. 192/98; 192/110 B; 308/233
[58] Field of Search ............... 192/98, 110 B; 308/233

[56] References Cited

U.S. PATENT DOCUMENTS 4,013,327  3/1977  Kunkel et al. ..................... 192/98 X Primary Examiner—Roy Lake
Assistant Examiner—DeWalden W. Jones
Attorney, Agent, or Firm—Daniel M. Rosen

[57] ABSTRACT

A clutch disengaging device which includes a sliding sleeve assembly and a self-centering clutch pressure bearing having a stationary bearing ring resting against the sliding sleeve assembly. The clutch pressure bearing is centered in the process of engagement and held by suitable means in a radial direction, such as adhesive means on facing surfaces of the sliding sleeve assembly and the stationary bearing ring for bonding the facing surfaces together.

10 Claims, 3 Drawing Figures

CLUTCH DISENGAGING DEVICE HAVING A SELF-CENTERING CLUTCH PRESSURE BEARING

BACKGROUND OF THE INVENTION

The present invention relates to clutch disengaging devices and particularly to clutch disengaging devices having a self-centering clutch pressure bearing whose stationary bearing ring rests against a sliding sleeve or a pressure plate combined with a sliding sleeve, the clutch pressure bearing being held by suitable means in radial direction.

Self-centering disengaging devices for clutches are known wherein the bearing, as a unit, is movable with clearance on all sides in the bearing support. In such arrangements, the stationary bearing ring is subjected to pressure, before and after disengagement, by a spring acting in the axial direction of the bearing support. However, this known design has the disadvantage, in the case of strong thrusts against the effect of the spring, that the clutch pressure bearing may be displaced eccentrically, and in the process of engagement must again be restored to its central position, giving rise to chatter and wear of the bearing parts.

It is therefore the prime object of the present invention to provide a clutch disengaging device of the type described above, in which the chatter of the mechanism between the clutch pressure bearing and the sliding sleeve or the pressure plate combined with the sliding sleeve, as well as the wear between the clutch pressure bearing and the sliding sleeve or the pressure plate combined with the sliding sleeve, are eliminated.

SUMMARY OF THE INVENTION

The foregoing object is realized, in accordance with the invention, by arranging between facing radial surfaces of a sliding sleeve assembly, which may be either the sliding sleeve or a pressure plate combined with the sliding sleeve, and the stationary bearing ring or the like, an adhesive coating of an adhesive means the subsequently harden.

In accordance with a further feature of the invention, the adhesive coating consists of a layer of a microencapsulated bonding agent which, in the first process of engagement, is released by fracture or breakage of the capsules after hardening the bonding agent bonds the centered clutch pressure bearing tightly to the sliding sleeve or the pressure plate combined with the sliding sleeve.

The foregoing objects and brief description, as well as additional features of the present invention may be grasped from two embodiments which are described in greater detail and represented in the accompanying drawings, face 22 and surface 23 being adjacent alignment surfaces.

DETAILED DESCRIPTION OF THE PREFERRED EMBODIMENTS

Figure 1:
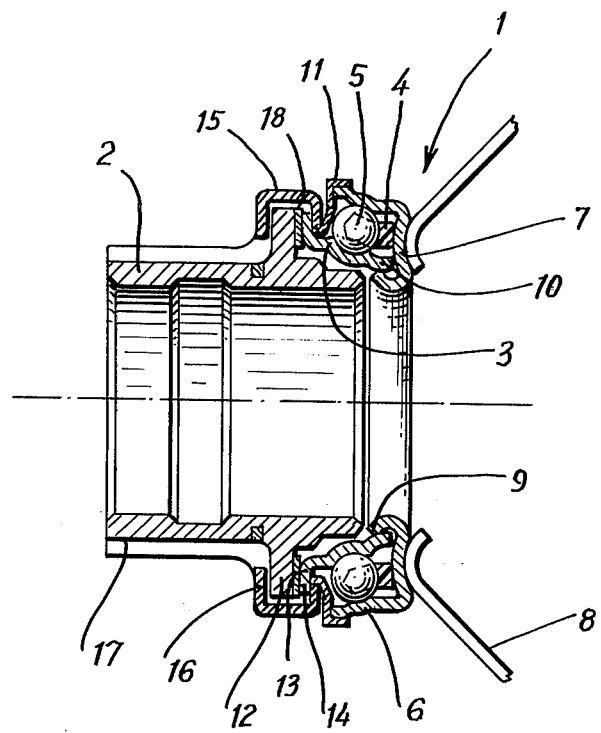
FIG. 1 shows a clutch disengaging device pursuant to the present invention, in section, in which the stationary bearing ring is joined to the sliding sleeve by a layer of a microencapsulated bonding agent.

Referring now to FIG. 1, there is shown a clutch disengaging device with a clutch pressure bearing 1 and the sliding sleeve 2. The clutch pressure bearing 1, arranged with radial clearance on the sliding sleeve 2, is centered after the first action of engagement and is combined with the sliding sleeve, in the centered position, by an adhesive which hardens following pressure or heat, and is described in greater detail below.

The clutch pressure bearing 1 has an inner ring 3, made of sheet metal, balls 5 carried in a cage 4 and an outer ring 6, likewise made of sheet metal. The outer ring, on the side facing the clutch, has a rotating concave contact surface 7 for the clutch lever 8. The radially outward-turned edge 9 of the outer ring 6, grips the edge 10 of the inner ring 3 from the back, with play, effectively sealing off this side of the bearing and combining the parts of the clutch pressure bearing 1 into one unit. On the other side of the clutch pressure bearing, the pressure bearing 1 is sealed by a sheet-metal cap 11 arranged on the surface of the outer ring, the cap 11 extending down with a clearance to the surface of the inner ring 3. The sliding sleeve 2 has a radially outwardly directed flange 12 with a radially running contact or aligment surface 13 on the side facing the bearing. On the contact surface 13 rests the stationary inner ring 3 with a radially outwardly directed flange 4. Before cementing the clutch pressure bearing 1 to the sliding sleeve 2, joining of these parts is effected by a sheet-metal cap 15, L-shaped in cross-section, and which is provided with two formed-on tabs 16 turned radially inward. The tabs 16 project into recesses 17 of the sliding sleeve 2, while the shank of the sheet-metal cap 15, directed radially inward, grips the flange 14 of the inner ring 3 from behind. On the contact or alingment surface 13 of the flange 12 and/or the flange 14 is mounted a layer 18 of a microencapsulated bonding agent which is released in the first action of engagement by fracture or breakage of the capsules occurring under pressure. The released bonding agent fixes the centered clutch pressure bearing 1 in this position after hardening of the adhesive.

Figure 2:
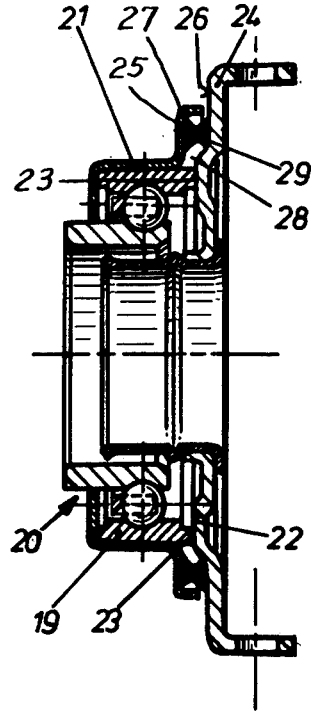
FIG. 2 shows an additional embodiment of a clutch disengaging device, pursuant to the present invention, in section, with an adhesive coating provided in the form of a spot or dot.
Figure 3:
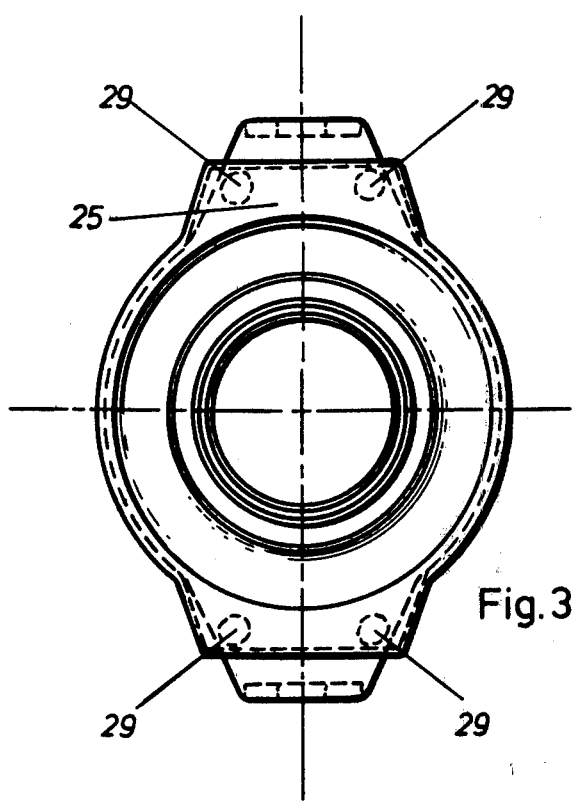
FIG. 3 shows a left side view of the clutch disengaging device of FIG. 2.

In FIGS. 2 and 3 a clutch disengaging device is shown in which the stationary outer ring 19 of the clutch pressure bearing 20 is situtated in a sheet-metal cap 21; ring 19 has a radially displaceable face 22 that rests along a limited circumference against a surface 23 of a presure plate 24. The sheet-metal cap 21 is provided on the side facing away from the clutch with two diametrically opposed tabs or flanges 25 which extends radially outward and are situated at a distance from the surface 26 of the pressure plate 24. The edges 27 of the tabs 25 face axially toward plate 24, resulting in two spaces 28, bounded by the metal cap 21 and the pressure plate 24. In each of these spaces 28 is situated two elastic adhesive coatings 29, which may be shaped as a spot or dot, and which join the metal cap to the pressure plate 24. By this means the clutch pressure bearing 20 is enabled to adjust itself freely, within certain limits, in the radial direction. The adhesive coatings 29 are applied before assembly of the clutch disengaging device, on the pressure plate 24 and on the metal cap 21, and then these parts are put together after these two facing adhesive coatings are combined, they harden into elastic double cones.

The embodiments described represent merely examples of a clutch disengaging device pursuant to the present invention. Changes in the construction of the individual components are readily possible within the spirit and scope of the invention. Thus, for example, the sheet-metal cap 21 represented in FIG. 2, may be provided with a radial flange and joined directly, for example, by a microencapsulated bonding agent, to the pressure plate or the like. Other variations, modifications, substitutions, additions, or deletions, will be apparent to those skilled in the art.

What is claimed is:

1. In a clutch disengaging device including a sliding sleeve assembly and a self-centering clutch pressure bearing which includes a stationary bearing ring, the improvement wherein said bearing ring and sliding sleeve assembly comprise first and second adjacent facing alignment surfaces respectively and corresponding first and second adhesive means on both of said alignment surfaces, said two adhesive means being bondable together when said facing alignment surfaces are urged together, said pressure bearing and sliding sleeve assembly and their respective alignment surfaces being radially movable relative to each other for centering said bearing during assembly of this device, and being radially fixed after said adhesive means are bonded together.

2. The clutch disengaging device of claim 1, wherein each of said adhesive means comprises a layer of a microencapsulated bonding agent.

3. The clutch disengaging device of claim 1, wherein each of said adhesive means is shaped as a dot.

4. The clutch disengaging device of claim 1, wherein said two adhesive means when bonded together form a double cone having an axis parallel to that of the bearing.

5. A device according to claim 1 wherein said bonded together adhesive means are elastic.

6. A clutch disengaging device comprising a sliding sleeve assembly and a self-centering clutch pressure bearing which includes a stationary bearing ring, the improvement wherein said sliding sleeve assembly comprises a first annular part with a first alignment surface thereon facing generally axially, said stationary bearing ring comprises a second annular part with a second alignment surface thereon facing said first alignment surface, holding means for engaging and restraining said first and second annular parts from relative axial movement, and adhesive bonding means secured to at least one of said alignment surfaces and being adhereable to the other when said surfaces are urged together, said pressure bearing and sliding sleeve assembly and their respective alignment surfaces being relatively radially movable for centering said bearing during assembly of this device, and being relatively radially fixed after said adhesive means bonds together said alignment surfaces.

7. A device according to claim 6 wherein said first and second annular parts comprise first and second flanges respectively, extending radially outward.

8. A device according to claim 6 wherein said adhesive means comprises a coating on at least one of said alignment surfaces.

9. A device according to claim 8 wherein said holding means is an annular cap generally surrounding the outer circumference of said flanges.

10. In a clutch disengaging device including a sliding sleeve assembly and a self-centering clutch pressure bearing which includes a stationary bearing ring, the improvement wherein said bearing ring and sliding sleeve assembly comprise first and second adjacent facing alignment surfaces respectively, adhesive means on at least one of said alignment surfaces, said adhesive means being bondable to the other alignment surface when said facing alignment surfaces are urged together, said pressure bearing and sliding sleeve assembly and their respective alignment surfaces being radially movable relative to each other for centering said bearing durng assembly of this device, and being relatively radially fixed after said adhesive means bonds said alignment surfaces together.

* * * * *

UNITED STATES PATENT AND TRADEMARK OFFICE
CERTIFICATE OF CORRECTION

PATENT NO. : 4,125,181

DATED : November 14, 1978

INVENTOR(S) : Karlheinz Stenzinger

It is certified that error appears in the above-identified patent and that said Letters Patent are hereby corrected as shown below:

Column 1, line 41, Omit "the", insert --that--.

Column 1, line 42, Change "harden" to --hardens--.

Column 1, line 55, After "drawings" omit --,-- and insert --.--.

Column 1, lines 55-56, Omit "face 22 and surface 23 being adjacent alignment surfaces"

Column 2, line 51, After "24" insert --, face 22 and surface 23 being adjacent alignment surfaces--.

Column 2, line 66, After "together" insert --.After--.

Column 2, line 66, Delete "after".

Signed and Sealed this

Twenty-ninth Day of May 1979

[SEAL]

Attest:

RUTH C. MASON
*Attesting Officer*

DONALD W. BANNER
*Commissioner of Patents and Trademarks*